United States Patent
Carminati et al.

(10) Patent No.: US 11,860,328 B2
(45) Date of Patent: Jan. 2, 2024

(54) DETECTION SYSTEM FOR DETECTING DISCONTINUITY INTERFACES AND/OR ANOMALIES IN PORE PRESSURES IN GEOLOGICAL FORMATIONS

(71) Applicant: ENI S.P.A., Rome (IT)

(72) Inventors: Stefano Carminati, San Donato Milanese (IT); Massimo Zampato, Venice (IT); Stefano Mauro, Turin (IT); Renato Galluzzi, San Benigno Canavase (IT)

(73) Assignee: ENI S.P.A., Rome (IT)

( * ) Notice: Subject to any disclaimer, the term of this patent is extended or adjusted under 35 U.S.C. 154(b) by 62 days.

(21) Appl. No.: 17/621,336

(22) PCT Filed: Jun. 22, 2020

(86) PCT No.: PCT/IB2020/055869
§ 371 (c)(1),
(2) Date: Dec. 21, 2021

(87) PCT Pub. No.: WO2020/261092
PCT Pub. Date: Dec. 30, 2020

(65) Prior Publication Data
US 2022/0397692 A1  Dec. 15, 2022

(30) Foreign Application Priority Data
Jun. 24, 2019  (IT) .................. 102019000009873

(51) Int. Cl.
*G01V 1/50* (2006.01)
*E21B 47/013* (2012.01)
(Continued)

(52) U.S. Cl.
CPC .............. *G01V 1/50* (2013.01); *E21B 47/013* (2020.05); *E21B 47/06* (2013.01); *G01V 1/183* (2013.01);
(Continued)

(58) Field of Classification Search
CPC . G01V 1/50; G01V 1/52; G01V 1/183; E21B 47/013; E21B 47/06
See application file for complete search history.

(56) References Cited

U.S. PATENT DOCUMENTS 2,405,179 A  8/1946  Black, Jr. et al.
3,583,158 A * 6/1971  Foster ...................... B25D 9/06
60/369
(Continued)

FOREIGN PATENT DOCUMENTS

CN  1947005 A  4/2007
CN  102066685 A  5/2011
(Continued)

OTHER PUBLICATIONS

International Search Report dated Aug. 13, 2020 re: Application No. PCT/IB2020/055869, pp. 1-4, citing: US 2015/0361790 A1, US 2 405 179 A, US 2012/0051188 A1, US 4 001 765 A1, Cn 108 169 340 A, US 2015/0167393 A1, US 2017/0167252 A1.
(Continued)

*Primary Examiner* — Ian J Lobo
(74) *Attorney, Agent, or Firm* — CANTOR COLBURN LLP

(57) ABSTRACT

A detection system includes a drill bit where electro-acoustic transducers operate as a transmitter and/or receiver, are integrated; electronic circuits; a control unit associated with a data storage unit and is powered by an electrical supply system, the processing and control unit for generating driving signals sent to the electro-acoustic transducer acting as
(Continued)

a transmitter by the analogue driving electronic circuits, for acquiring signals received from the transducer and for processing the received signals to determine discontinuity interfaces and/or anomalies in pore pressures in geological formations; wherein each of the electro-acoustic transducers is in contact with a pressurised fluid and includes: a tubular body with two end portions opposed to each other longitudinally, internally a first chamber ending with the first end portion and a second chamber on one side adjacent and in fluid communication with the first chamber and, on the other side ending with the second end portion.

11 Claims, 4 Drawing Sheets

(51) Int. Cl.
  *E21B 47/06* (2012.01)
  *G01V 1/52* (2006.01)
  *G01V 1/18* (2006.01)

(52) U.S. Cl.
  CPC ........ *G01V 1/52* (2013.01); *G01V 2210/1299* (2013.01); *G01V 2210/1429* (2013.01); *G01V 2210/62* (2013.01)

(56) References Cited

U.S. PATENT DOCUMENTS

| | | | |
|---|---|---|---|
| 4,001,765 A | 1/1977 | Sims | |
| 6,145,615 A * | 11/2000 | Beresford | F16F 7/104 181/102 |
| 6,367,565 B1 * | 4/2002 | Hall | E21B 41/0085 175/50 |
| 7,392,857 B1 * | 7/2008 | Hall | E21B 4/14 408/229 |
| 2010/0050762 A1 | 3/2010 | Nold, III et al. | |
| 2010/0118657 A1 * | 5/2010 | Trinh | E21B 47/013 367/82 |
| 2012/0031669 A1 * | 2/2012 | Foster | E21B 47/24 175/45 |
| 2012/0051188 A1 | 3/2012 | Graber | |
| 2015/0167393 A1 | 6/2015 | Rasheed | |
| 2015/0361790 A1 | 12/2015 | Ferrara et al. | |
| 2017/0167252 A1 | 6/2017 | Pratt et al. | |
| 2018/0100387 A1 | 4/2018 | Kouchmeshky et al. | |

FOREIGN PATENT DOCUMENTS

| | | |
|---|---|---|
| CN | 102459896 A | 5/2012 |
| CN | 105257282 A | 1/2016 |
| CN | 108169340 A | 6/2018 |
| CN | 108271409 A | 7/2018 |
| RU | 2276475 C1 | 5/2006 |
| RU | 2609440 C1 | 2/2017 |

OTHER PUBLICATIONS

Written Opinion dated Aug. 13, 2020 re: Application No. PCT/IB2020/055869, pp. 1-11, citing: US 2015/0361790 A1, US 2 405 179 A, US 2012/0051188 A1, US 4 001 765 A1, Cn 108 169 340 A, US 2015/0167393 A1, US 2017/0167252 A1.
Chinese First Office Action for Chinese Application No. 202080046627.4, dated Aug. 31, 2023, 17 pages with machine translation.

* cited by examiner

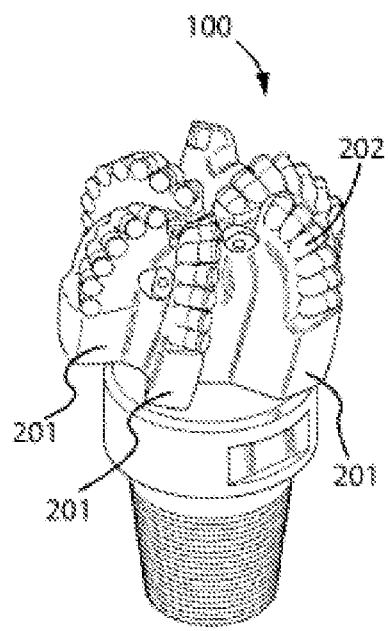
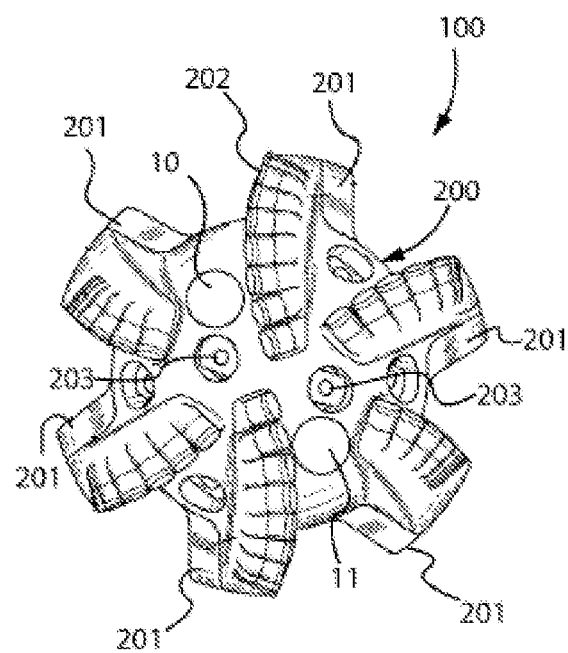
Fig. 3a  Fig. 3b
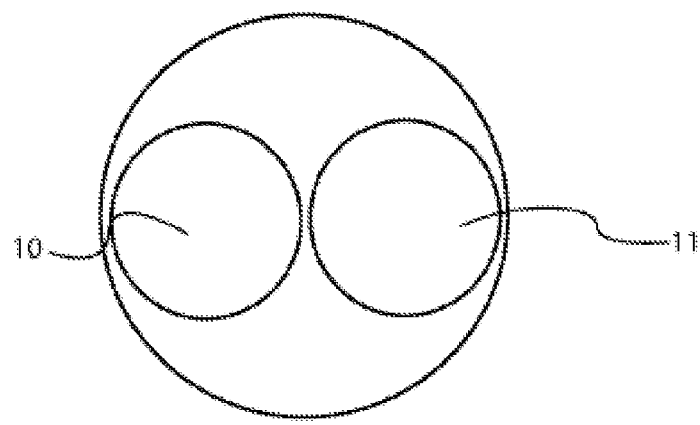
Fig. 4

DETECTION SYSTEM FOR DETECTING DISCONTINUITY INTERFACES AND/OR ANOMALIES IN PORE PRESSURES IN GEOLOGICAL FORMATIONS

TECHNICAL FIELD

The present disclosure relates to a detection system for detecting discontinuity interfaces and/or anomalies in pore pressures in geological formations.

BACKGROUND

These may be due to the passage from rock formations of different densities (e.g. clayey layers, reservoir rocks that contain liquid and/or gaseous hydrocarbons, salt domes, basalts) or to karst phenomena or faults which if not signalled can lead to the formation loss of the drilling mud with all the consequences of the case such as an increase in costs to restore the quantity of mud necessary to continue drilling or such as problems of instability of the walls of the well that could arise when the hydraulic thrust of the mud that is lacking due to the formation loss is reduced.

It is therefore essential to detect rock formations containing overpressure fluids before the drilling head or drill bit reaches the area itself.

The possibility of identifying the position of a discontinuity interface and/or an anomaly in the pore pressures allows in fact to adopt a series of preventive measures in order to prevent a blowout situation from being triggered, that is, a dangerous event of uncontrolled leakage from the extraction well (blowout) of the fluids, in overpressure with respect to the hydraulic thrust of the mud, by adopting appropriate countermeasures.

The solution currently used is to estimate the pressures in advance with respect to the drilling operations, by means of seismic reflectometry methods in order to identify the trends of these pressures at resolutions of the order of about ten meters.

Subsequently, the estimated trends are possibly recalibrated as a function of the depth of the well, with local measurements in the well (sound speed, resistivity, gamma ray, density and so on) carried out during drilling. In this way, there is also an improvement in the lateral resolution of the pressure trends.

The mathematical models used today for processing the measurements and the definition of the trends of the pore pressures of the formations are estimation models that do not allow to predict anomalous pressures, possibly present in the formations yet to be drilled, in particular if the lithology of these formations shows rapid variations with respect to the formation on the side of the drill bit and/or the causes of the geo-pressures lie in phenomena not attributable to sub-compaction.

In order to detect discontinuity interfaces and/or anomalies in the pore pressures in geological formations, it is known to apply the geophony by using voice coil type electromagnetic actuators as a receiver which can have a movable coil and a fixed magnetic core or vice versa a fixed coil and a magnetic movable equipment.

US20180100387A1 illustrates the realisation of electromagnetic transducers by exploiting different types of permanent magnets in a movable part for geophonic measurement.

It is also known to use capacitive type transducers, such as the so-called MEMS, or of the optical or piezoelectric type; the latter can reach maximum operating frequencies comprised between about 3 and 5 MHz.

In any case, the transducers used in known detection systems are characterized by relatively high dimensions and energy consumption high enough to require the connection to an electrical power supply which increases the complexity of installation at high depths; finally, the above-mentioned devices are not designed to operate at the high pressures that are typical of the working area at the bottom of the well.

SUMMARY

The present disclosure overcomes the above-mentioned drawbacks and in particular to devise a detection system for detecting discontinuity interfaces and/or anomalies in pore pressures in geological formations which is capable of carrying out measurements directly ahead of the drill bit in order to make a prediction of anomalous pressures at a few meters of depth in the formations yet to be drilled in front of the drill bit.

This and other aims according to the present disclosure are obtained by realising a detection system for detecting discontinuity interfaces and/or anomalies in the pore pressures in geological formations as recited in claim 1.

Further characteristics of the detection system for detecting discontinuity interfaces and/or anomalies in pore pressures in geological formations are the subject of the dependent claims.

BRIEF DESCRIPTION OF THE DRAWINGS

The characteristics and advantages of a detection system for detecting discontinuity interfaces and/or anomalies in pore pressures in geological formations according to the present disclosure will be more evident from the following description, which is to be understood as exemplifying and not limiting, with reference to the appended schematic drawings, wherein:

FIGS. 3*a* and 3*b* are respectively a perspective view and a plan view of a preferential but not limiting embodiment of a detection system according to the present disclosure;

FIG. 4 is a schematic view of another embodiment of a detail of the detection system according to the present disclosure;

DETAILED DESCRIPTION OF THE DRAWINGS

Figure 1:
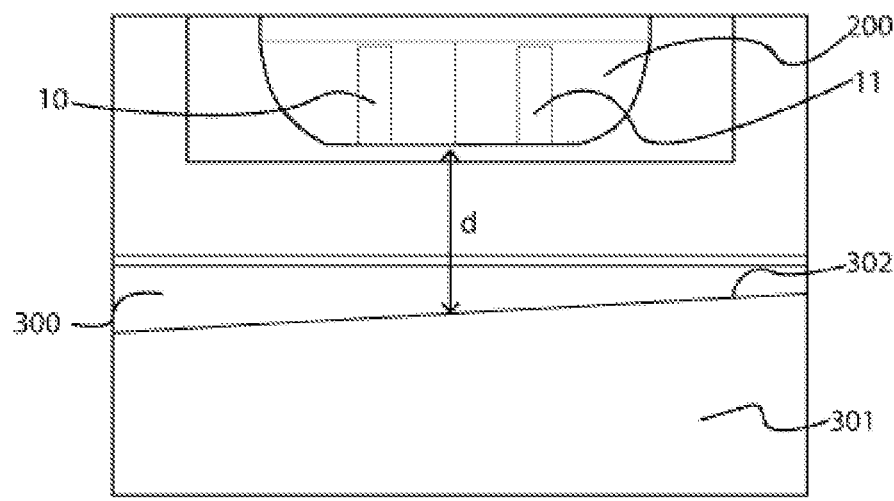
FIG. 1 shows a potential application scenario of a detection system according to the present disclosure.
Figure 2:
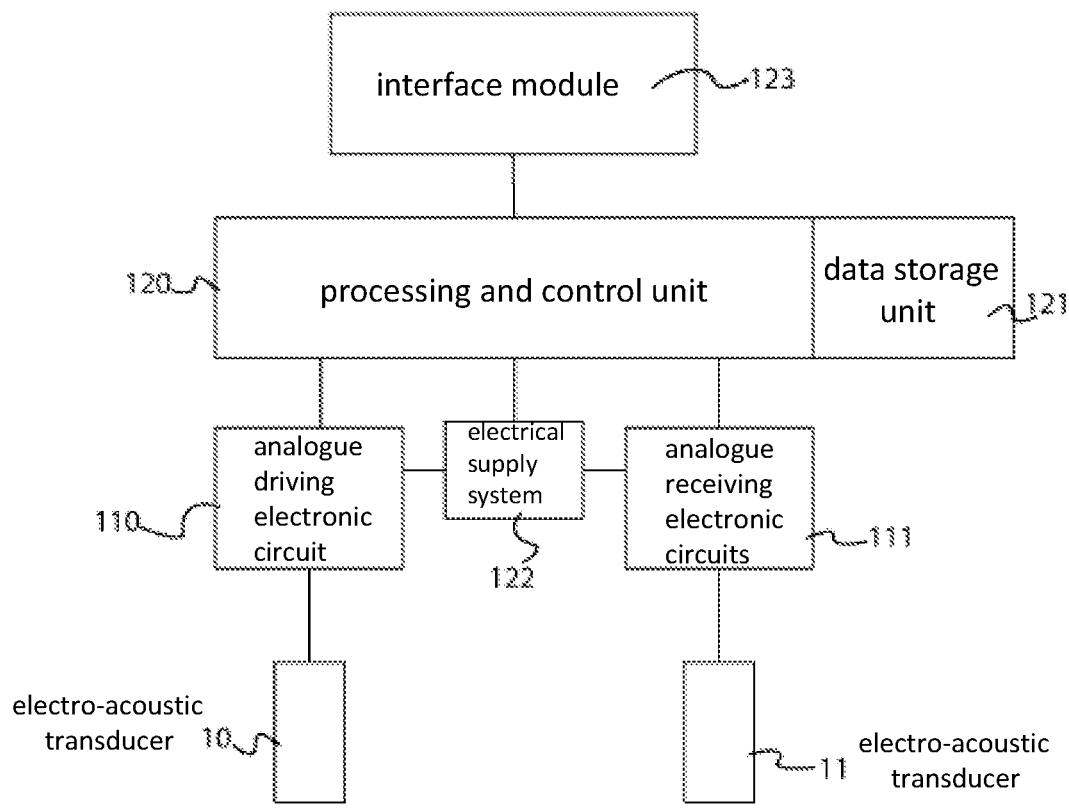
FIG. 2 shows a block diagram of an embodiment of the detection system according to the present disclosure.

With reference to the figures, a detection system for detecting discontinuity interfaces and/or anomalies in pore pressures in geological formations indicated as a whole with 100 is shown.

The detection system 100 for detecting discontinuity interfaces and/or anomalies in pore pressures in geological formations comprises a drill bit 200 for drilling the underground in which, according to the present disclosure, one or more electro-acoustic transducers 10, 11, 12 are integrated. If only one electro-acoustic transducer 12 is present, it is intended to operate selectively as a transmitter or as a receiver of acoustic waves in the frequency range 450-5000 Hz, preferably 500-3000 Hz; in this case the electro-acoustic transducer is defined as bifunctional. If at least two electro-acoustic transducers 10, 11 are present, they are intended to operate one as a transmitter 10 and the other as a receiver 11 of acoustic waves in the frequency range 450-5000 Hz, preferably 500-3000 Hz.

In the present discussion, the working band will refer to the frequency range 450-5000 Hz, or more preferably the frequency range 500-3000 Hz.

In this way it is possible to identify discontinuities in the acoustic response of the acoustic transducers 10, 11, 12 due to the characteristics of the rocks (e.g. karst phenomena, faults, alternation of rock formations, clayey layers, reservoir rocks that contain liquid and/or gaseous hydrocarbons, salt domes, basalts) or overpressures of the fluids of the rock formations.

The detection system 100 then comprises analogue driving electronic circuits 110 configured to control the electro-acoustic transducer that acts as a transmitter and analogue receiving electronic circuits 111 for amplifying and processing the signal received from the electro-acoustic transducer acting as a receiver. The detection system 100 also comprises a processing and control unit 120, for example a microprocessor, associated with the analogue driving 110 and receiving 111 electronic circuits for managing the detection process. The processing and control unit 120 is associated with a data storage unit 121 and is powered electrically by an electrical supply system 122, for example comprising a battery system. The processing and control unit 120 is also provided with an interface module 123 towards the bottom hole assembly or BHA. For example, this interface module 123 comprises electrical/electronic circuits suitable for communicating with and possibly receiving power supply from the BHA.

In the present description, reference will be made by way of example to the application scenario of FIG. 1 in which the drill bit 200 is close to two geological formations 300, 301 placed in succession along the advancement direction of the drill bit and separated by a discontinuity interface 302 placed at a distance d from the drill bit 200.

Each of the electro-acoustic transducers 10, 11, 12 is axial-symmetrical and comprises a main tubular body 20 preferably of a cylindrical shape and preferably of ferromagnetic material which extends in length along a longitudinal direction X; said main tubular body 20 comprises a first end portion 21 and a second end portion 22 opposed to each other longitudinally.

Furthermore, the main tubular body 20 has internally a first chamber 23 which ends with the first end portion 21 and a second chamber 24 on one side adjacent and in fluid communication with the first chamber 23 and on the other side ending with the second end portion 22.

The compartment defined internally by the chambers 23, 24 can be of any shape, preferably cylindrical.

The first end portion 21 is closed towards the outside by means of a membrane 26 applied to the main tubular body 20.

Said membrane 26 is preferably made of harmonic steel.

The second end portion 22 has one or more openings 27 that put it into fluid communication towards the outside of the main tubular body 20.

The first chamber 23 contains in its walls a plurality of electrical windings 25 arranged in succession between them in the longitudinal direction X.

The electric windings 25 are preferably made by means of metal rings, preferably of copper separated by an insulating layer, for example an insulating film. This embodiment of the electric windings 25 is particularly advantageous since it uses the electro-acoustic transducer as an acoustic signal transmitter.

The electro-acoustic transducer 10 also comprises a movable element 30 housed in the first chamber 23; said movable element 30 advantageously comprises a plurality of permanent magnets 31, preferably but not necessarily cylindrical, packed one above the other. In particular, the permanent magnets 31 are arranged with alternate magnetisation in the longitudinal direction X, are stacked, separated one from the other by discs 32 of ferromagnetic material and held together by a pin 33 crossing them for example centrally as shown in FIG. 1.

The permanent magnets 31 are preferably of Samarium-Cobalt.

The movable element 31 is supported at the longitudinal ends by springs 40, preferably by a pair of pre-loaded Belleville springs 40 as illustrated in FIG. 1. Each of these springs 40 is constrained on one side to the movable element 31 and on the other side to the internal walls of the first chamber 23.

The movable element 30 is also advantageously connected to the membrane 26, preferably by means of an extension element 27 coupled on one side to an end of the movable element 30 and on the other side to the membrane 26.

The electro-acoustic transducer 10 further comprises a movable piston 45 positioned in the second end portion 22.

The second end portion 22 is preferably coupled to a bush 28 which extends towards the inside of the second chamber 24 for a stretch of its length in such a way as to restrict the inner passage. In this case the movable piston 45 is positioned in the restricted inner passage. The second chamber 24 is filled with a liquid, preferably oil.

When the electrical windings 25 are electrically powered with a signal to be transmitted, the interaction between the variable magnetic field generated by the electrical windings 25 and the permanent magnets 31 of the movable element 30 induces an oscillating translation of the movable element 30 which acts on the membrane 26 causing it to vibrate and thus causing acoustic waves in the fluid surrounding the electro-acoustic transducer 10 in contact with the membrane 26 itself. The displacements of the movable element 31 cause a pressure variation inside the second chamber 24. These pressure variations are compensated by the movement of the movable piston 45 which is free to move depending on the pressure difference that can temporarily arise between the environment outside the electro-acoustic transducer and the second chamber 24. The movable piston 45 in fact reduces or increases the volume of the second chamber 24 in which oil is contained, obtaining static pressure compensation.

This pressure compensation achieved by the piston advantageously allows using the electro-acoustic transducer 10 in critical environments at high pressures up to about 700 bar.

The movable piston 45 and the second chamber 24 are sized to allow pressure compensation when acoustic signals are transmitted and received in the entire frequency range specified above, i.e. 450-5000 Hz, preferably 500-3000 Hz.

In particular, the second chamber 24 is sized in such a way that the system composed of the movable element 30, of the liquid contained inside the second chamber 24 and of the movable piston 45, has an overall dynamic behaviour such that it guarantees the balance of the internal and external pressure, keeping the difference between the two pressure values close to zero outside the entire frequency range 450-5000 Hz against a peak-to-peak displacement of the movable element 30 by a few tens of micrometers.

This behaviour is determined by the transfer function which is determined between the displacement of the movable element 30 and the pressure difference between the inside and outside of the electro-acoustic transducer 10. The transfer function depends on the volume of the second chamber 24, on the section of the same chamber, on the mass and diameter of the movable piston 45 and on the elasticity modulus of the liquid that fills the second chamber 24, normally indicated as the bulk module.

The length of the second chamber 24 is determined as a function of the internal section of the electro-acoustic transducer 10, that is of the internal section of the first chamber 23, as a function of the mass, of the diameter of the movable piston 45 and of the bulk module of the liquid that fills the second chamber 24.

Since this last parameter varies according to the type of liquid used, the pressure and the temperature, the sizing must be developed considering the most critical expected conditions. The sizing is carried out on the basis of a dynamic model of the system described by the following equations:

$$m_p\ddot{x} + \beta_p\dot{x} + \beta_m\dot{x} + (k_m + k_p)x = F + P_1 A_p - P_{est} A_m$$
$$m_1\ddot{y}_1 + \beta_1\dot{y}_1 + k_1 y_1 = P_1 A_1 - P_{est} A_1$$
$$V_1 = V_{10} + A_m x + A_1 y_1$$
$$\frac{dV_1}{dt} = A_m \dot{x} + A_1 \dot{y}_1$$
$$\frac{dP_1}{dt} = \frac{\beta_{ol}}{V_1}\left(-\frac{dV_3}{dt}\right)$$

where F is the force generated by the transducer, x is the displacement of the movable element 30, y1 is the displacement of the movable piston 45, P1 is the pressure of the second chamber 24, Pest is the external pressure, Ap is the area of the cross section of the movable element 30, A1 is the area of the cross section of the movable piston 45, Am is the area of the cross section of the membrane 26, V1-V10 is the volume variation of the second chamber 24 due to the displacement of the equipment and movable pistons βol is the oil compressibility modulus, βm, β1 and βp are the damping coefficients of the membrane 26, of the movable piston 45 and of the movable element 30, respectively, mp and m1 are the masses of the movable element 30 and of the movable piston 45, respectively, km, kp and k1 are the stiffnesses of the membrane 26, of the movable element 30 and of the movable piston 45, respectively.

By way of example, in order to work at a temperature of 200° C. and at a pressure of 700 bar, the following configuration has been identified:
membrane diameter 26=9.6 mm;
diameter of the second chamber 24=8 mm;
length of the second chamber 24=25.5 mm;
section of the movable piston 45=6 mm;
mass of the movable piston 45=0.9 g;
oil elasticity modulus 1<β<2.5 GPa.

Furthermore, again by way of example, in order to maximize the transmitted power and the sensitivity of the electro-acoustic transducer 10 in the 500-3000 Hz band, the equivalent stiffnesses of the pairs of Belleville springs must be:
3.5 kN/mm for an electro-acoustic transducer intended to be used as a transmitter;
0.4 kN/mm for an electro-acoustic transducer intended to be used as a receiver.

An electro-acoustic transducer 10 intended to be used as a transmitter is designed to operate for example in a steady regime in the bands specified above, guaranteeing an acoustic power of approximately effective 20 mW.

An electro-acoustic transducer 10 intended to be used as a receiver is preferably designed to guarantee a transduction sensitivity of 20 Vs/m.

Preferably, the drill bit 200 is of the PDC type (Polycrystalline Diamond Composite) as the one illustrated in FIGS. 3a and 3b. The PDC type drill bit 200 has a plurality of ridges 201 provided with diamond cutting elements 202 and a central portion where there are holes 203 for the passage of the drilling mud.

The one or more electro-acoustic transducers 10, 11, 12 are housed in special compartments made in the drill bit 200; this entails a series of constraints on the size of the electro-acoustic transducers 10, 11, 12 which must have a diameter in the order of a few centimeters.

In particular, if the drill bit 200 is of the PDC type, the housing compartments for the electro-acoustic transducers 10, 11, 12 are made in the space among the ridges avoiding the central portion; the space among the ridges can have for example a diameter comprised between 0.5" and 1".

In a possible embodiment of the present disclosure, a pair of electro-acoustic transducers 10, 11 configured to operate as a receiver and transmitter are housed in two separate compartments of the drill bit 200. In the embodiment illustrated in FIGS. 3a and 3b the housing compartments of the electro-acoustic transducers are positioned at a distance not greater than 7 cm among the ridges 201 with the diamond cutting elements 202 so that the flow of the drilling mud towards the holes 203 is allowed.

In an alternative embodiment illustrated in FIG. 4, a pair of electro-acoustic transducers 10, 11 configured to operate as a receiver and transmitter are housed in a single compartment, preferably with a diameter not greater than 7 cm.

In a further alternative embodiment, the drill bit 200 houses one or more bifunctional electro-acoustic transducers 12 associated with analogue driving and receiving electronic circuits so as to operate alternately as a transmitter and receiver. If a pair of bifunctional electro-acoustic transducers 12 is housed in the drill bit 200, the overall reliability of the detection system is increased.

The detection system 100 according to the present disclosure implements a detection method for detecting discontinuity interfaces and/or anomalies in pore pressures in geological formations.

This detection method comprises two detection phases; the first detection phase provides for an initial phase in which the electro-acoustic transducer 10 acting as a TX transmitter generates a first acoustic wave to detect the possible presence of any discontinuity in the formation, of the lithological type and/or due to pressure conditions in the pores.

In this phase, therefore, the electro-acoustic transducer 10 is driven by the processing and control unit 120 and by the respective analogue driving electronic circuit 110 by means of a driving signal which can be, for example:
an impulse with a fundamental frequency centred in the working band (for example 3 sinusoid cycles);

a frequency-modulated continuous sinusoid (at least 100 cycles), for example by a linear ramp (linear chirp). Following transmission, a reflected signal of this first acoustic wave is received, which signal is generated by at least one discontinuity interface due to the passage from a first to a second different geological formation, arranged in succession along the emission direction of the electro-acoustic transducer 10-transmitter.

After receiving the reflected signal, the processing and control unit 120 calculates the back and forth travel time of the compression stress wave which is the fastest and therefore the first to reach the electro-acoustic transducer 11 acting as a receiver, in the following exemplary ways:

- by looking for the peak of the cross-correlation between the transmitted and received signals; or
- by identifying the beat frequency of the multiplication between the transmitted and received signals.

The choice for the frequency-modulated continuous sinusoid as a driving signal of the electro-acoustic transducer 10 acting as a transmitter has the following advantages:

- digital processing which, in a manner known per se in the state of the art, involves a multiplication between the transmitted driving signal and the received signal, a low-pass filtering to remove the spectral components centred at the "sum" frequencies and an AC coupling to reduce the possible crosstalk component, can be implemented analogically by the analogue receiving electronic circuit 111; thereby:
  - in case of "deafening" of the electro-acoustic transducer 11 acting as a receiver (crosstalk), that is, in the case in which the electro-acoustic transducer-transmitter is very close to the transducer-electro-acoustic receiver and the latter receives together with the signal reflected by the formation also the signal transmitted by the transmitter, there is no impairment in the resolution of the useful signal before the digital acquisition performed by the processing and control unit since sampling is carried out after the analogue signal conditioning;
  - at equal depth of the discontinuity interface, the signal/noise ratio at the receiver is greater since the useful signal band is lower and consequently the noise power is lower;
- at equal transmitted energy, the transmission power is lower and therefore the required driving voltage is lower.

Figure 5:
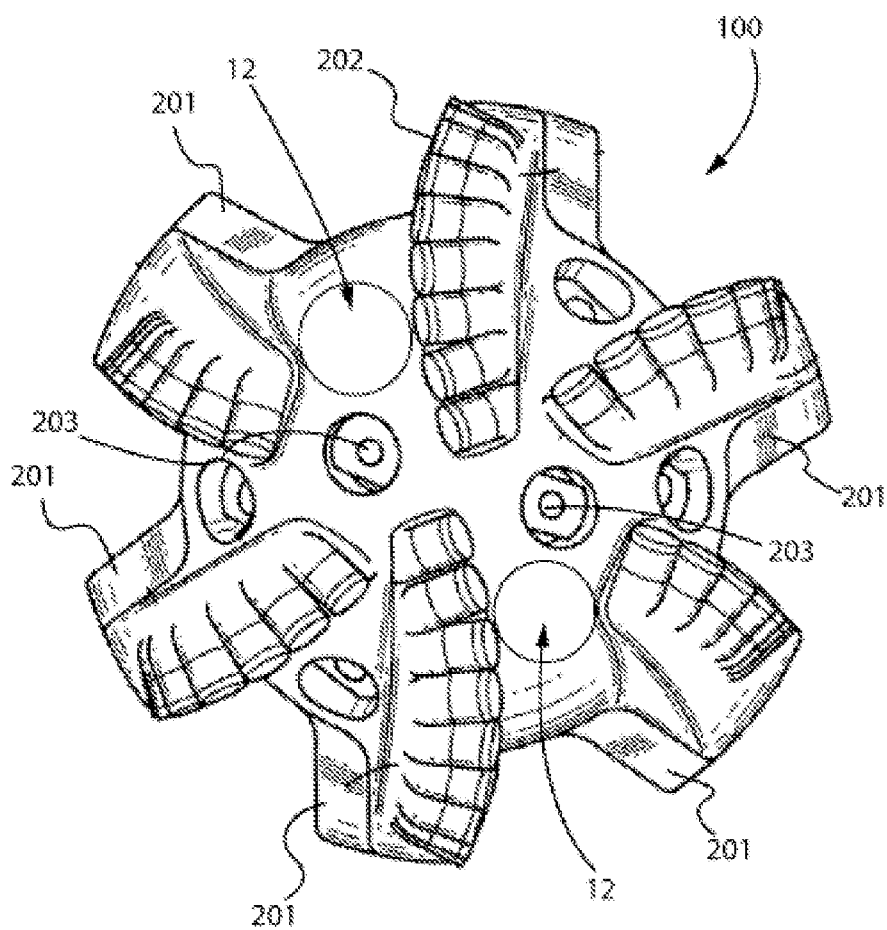
FIG. 5 is a plan view of another embodiment of the detection system according to the present disclosure.
Figure 6A:
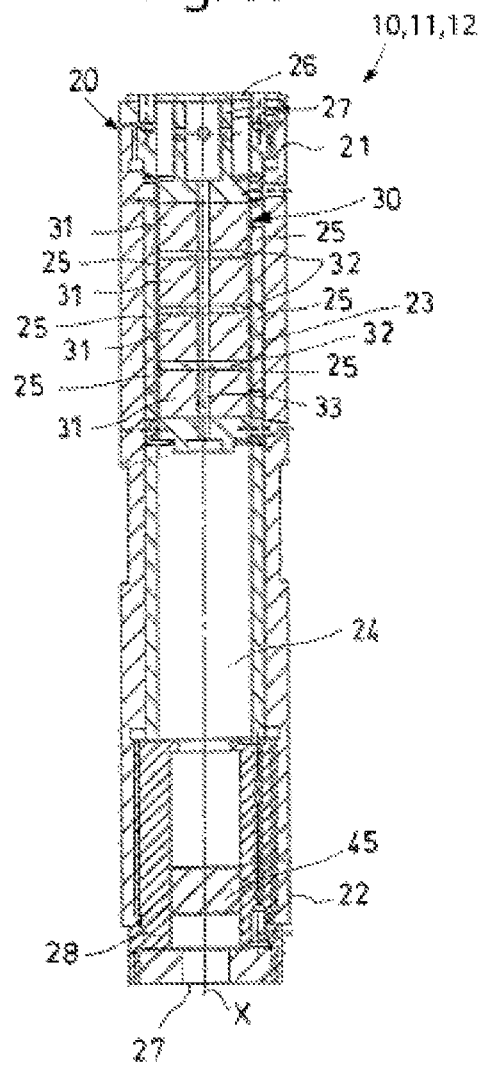
FIG. 6*a* is a section view of an electro-acoustic transducer included in the detection system according to the present disclosure.
Figure 6B:
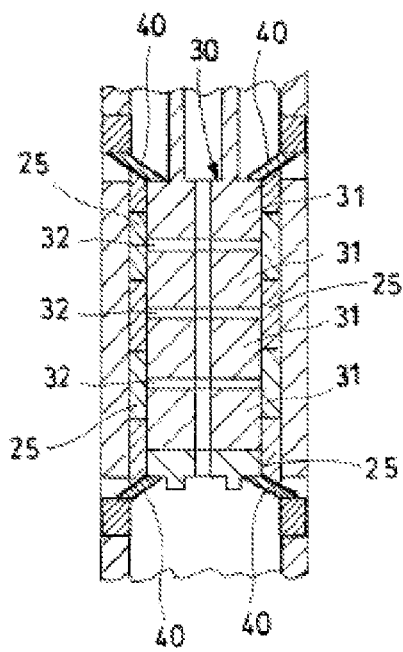
FIG. 6*b* is a view of a detail of the transducer of FIG. 6*a*.
Figure 7:
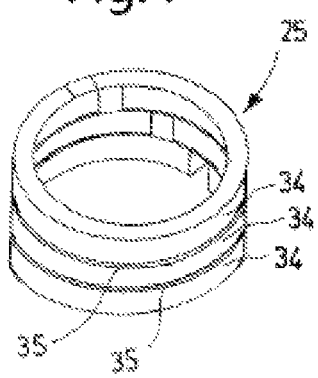
FIG. 7 is a schematic perspective view of an electrical winding present in the electro-acoustic transducer of FIG. 6*a*.

However, this choice for continuous wave driving signal is not compatible with the embodiment of FIG. 5, since the transmission and reception intervals are almost coincident.

After determining the back and forth travel time of the wave, the processing and control unit 120 calculates the distance d between the drill bit 200 and the discontinuity interface starting from the back and forth travel time of the wave and the compressional rate in the layer being drilled. The value of the compressional rate can be already known and obtained by the surface seismics and can possibly be confirmed and refined by the sonic logs of the conventional logging tool while drilling LWD. If however it is not available, it is possible to estimate the rate by repeating the measurement described above after having drilled at least a distance equal to the resolution of the measurement.

The resolution of the measurement depends on the band B of the transmitted signal and the propagation speed of the compressional wave in the geological formation cP1:

$$res = \frac{c_{P1}}{2B}$$

being B in the order of a few kHz and cP1 in the range 3-6 km/s, the best resolution is in the order of the meter.

After the first detection phase, the second detection phase begins, which provides for the electro-acoustic transducer 10 acting as a transmitter to generate a second acoustic wave to discriminate whether the anomaly detected in the first detection phase is due to a lithological change or to an abnormal pore pressure. The possible presence of an abnormal pressure in the second formation entails a particular attenuating/dispersive effect which can be mapped, for example, in the following transfer functions:

- electrical impedance Z(f) of the electro-acoustic transducer 10 acting as a transmitter
- frequency response H(f) of the system comprising the chain of the following subsystems: electro-acoustic transducer 10 acting as a transmitter—geological formation—electro-acoustic transducer 20 acting as a receiver.

In this second detection phase, therefore, the electro-acoustic transducer-transmitter 10 is driven by the processing and control unit 120 and by the respective analogue driving electronic circuit 110 by means of a driving signal which can be, for example:

- a set of discrete tones (duration at least 100 cycles to reach steady state) whose frequencies cover the working band with a sufficiently small pitch F (for example 10 Hz); or
- Gaussian white noise (duration of a few seconds), suitably filtered in the working band (bandpass filtering).

Following transmission, a reflected signal of this second acoustic wave is received, which signal is generated by at least one discontinuity interface due to the passage from a first to a second different geological formation, arranged in succession along the emission direction of the electro-acoustic transducer 10-transmitter.

After reception, the processing and control unit 120 calculates the above-mentioned transfer functions and estimates the pore pressure on the basis of these transfer functions using at least two types of approach known per se in the state of the art:

- an approach based on a suitable physical model that links the pore pressure in the second formation to the transfer functions described above;
- a pattern recognition approach based on a "supervised" classification algorithm for the recognition of "signatures" in the transfer functions indicated above due to the pore pressure in formation 2, such as for example some peak frequencies, both in the module and in the phase.

Since the second detection phase is based on a continuous wave (non-impulsive) measurement scheme, it is not compatible with the embodiment of FIG. 5, since the transmission and reception intervals are almost coincident.

From the description made, the characteristics of the detection system object of the present disclosure are clear, as are the relative advantages.

Finally, it is clear that the detection system thus conceived is susceptible of numerous modifications and variations, all of which are within the scope of the disclosure; moreover, all the details can be replaced by technically equivalent elements. In practice, the materials used, as well as the dimensions thereof, can be of any type according to the technical requirements.

The invention claimed is:

1. A detection system for detecting discontinuity interfaces and/or anomalies in pore pressures in geological formations comprising:
   a drill bit for drilling the subsoil in which one or more electro-acoustic transducers configured to operate as a transmitter and a receiver, are integrated;
   analogue driving electronic circuits configured to control the electro-acoustic transducer, which acts as a transmitter and analogue receiving electronic circuits for amplifying and processing the signal received from the electro-acoustic transducer acting as a receiver;
   a processing and control unit associated with the analogue driving and receiving electronic circuits, said processing and control unit being associated with a data storage unit and is powered electrically by an electrical supply system, said processing and control unit being configured for generating driving signals to be sent to the electro-acoustic transducer acting as a transmitter by means of said analogue driving electronic circuits, for acquiring the signals received from the electro-acoustic transducer acting as a receiver by means of said analogue receiving electronic circuits and for processing said received signals in such a way as to determine the presence of discontinuity interfaces and/or anomalies in pore pressures in geological formations;
   wherein each of said electro-acoustic transducers is adapted to be in contact with a pressurised fluid and is of the type comprising:
   a tubular body, which extends in length along a longitudinal direction X, said tubular body comprising a first end portion and a second end portion, opposed to each other longitudinally, said tubular body having internally a first chamber, which ends with the first end portion and a second chamber on one side adjacent and in fluid communication with said first chamber and, on the other side ending with said second end portion, said first end portion being closed towards the outside by means of a membrane applied to said tubular body, said second end portion having one or more openings that put it into fluid communication towards the outside of said tubular body, said first chamber containing in its walls a plurality of electrical windings arranged in succession between them in the longitudinal direction X, said second chamber being filled with a liquid;
   a movable element housed in said first chamber, said movable element comprising a plurality of permanent magnets packed and arranged one above the other with alternate magnetisation in the longitudinal direction X, and separated one from the other by discs of ferromagnetic material, said movable element being supported at the longitudinal ends by springs, said movable element also being connected to said membrane; and
   a movable piston positioned and slidable in the second end portion.

2. The detection system according to claim 1, wherein said electric windings are made of metal rings separated by an insulating layer.

3. The detection system according to claim 1, wherein said movable element is connected to said membrane by an extension element coupled on one side to an end of the movable element and on the other side to the membrane.

4. The detection system according to claim 1, wherein said springs are a pair of pre-loaded Belleville springs.

5. The detection system according to claim 1, wherein said second end portion is coupled to a bush, which extends towards the inside of the second chamber for a stretch of its length configured to restrict the inner passage, said movable piston being positioned in the restricted inner passage.

6. The detection system according to claim 1, wherein said movable piston and said second chamber are sized to allow pressure compensation when acoustic signals are transmitted or received in the frequency range 450-5000 Hz.

7. The detection system according to claim 1, wherein a pair of said electro-acoustic transducers configured to operate as a receiver and transmitter, are housed in two separate compartments of the drill bit.

8. The detection system according to claim 1, wherein a pair of electro-acoustic transducers configured to operate as a receiver and transmitter, are housed in a single compartment of the drill bit.

9. The detection system according to claim 1, wherein said one or more electro-acoustic transducers are bifunctional and configured to operate alternately as a transmitter and receiver.

10. The detection system according to claim 9, wherein a pair of said bifunctional electro-acoustic transducers are housed in one or more compartments of the drill bit.

11. A detection system for detecting discontinuity interfaces and/or anomalies in pore pressures in geological formations comprising:
    a drill bit for drilling the subsoil in which a bifunctional transducer is integrated, the bifunctional transducer is configured to operate alternately as a transmitter or as a receiver;
    analogue driving electronic circuits configured to control the bifunctional transducer, which acts as a transmitter and analogue receiving electronic circuits for amplifying and processing the signal received from the bifunctional transducer acting as a receiver;
    a processing and control unit associated with the analogue driving and receiving electronic circuits, said processing and control unit being associated with a data storage unit and is powered electrically by an electrical supply system, said processing and control unit being configured for generating driving signals to be sent to the bifunctional transducer acting as a transmitter by means of said analogue driving electronic circuits, for acquiring the signals received from the bifunctional transducer acting as a receiver by means of said analogue receiving electronic circuits and for processing said received signals in such a way as to determine the presence of discontinuity interfaces and/or anomalies in pore pressures in geological formations;
    wherein said bifunctional transducer is adapted to be in contact with a pressurised fluid and is of the type comprising:
    a tubular body, which extends in length along a longitudinal direction X, said tubular body comprising a first end portion and a second end portion, opposed to each other longitudinally, said tubular body having internally a first chamber, which ends with the first end portion and a second chamber on one side adjacent and in fluid communication with said first chamber and, on the other side ending with said second end portion, said first end portion being closed towards the outside by means of a membrane applied to said tubular body, said second end portion having one or more openings that put it into fluid communication towards the outside of said tubular body, said first chamber containing in its walls a plurality of electrical windings arranged in succession between them in the longitudinal direction X, said second chamber being filled with a liquid;

a movable element housed in said first chamber, said movable element comprising a plurality of permanent magnets packed and arranged one above the other with alternate magnetisation in the longitudinal direction X, and separated one from the other by discs of ferromagnetic material, said movable element being supported at the longitudinal ends by springs, said movable element also being connected to said membrane; and a movable piston positioned and slidable in the second end portion.

* * * * *